United States Patent
Xu et al.

(10) Patent No.: US 11,673,519 B2
(45) Date of Patent: Jun. 13, 2023

(54) HUB ROTATION IMAGING CONTROL SYSTEM

(71) Applicant: CITIC Dicastal CO., LTD., Hebei (CN)

(72) Inventors: Shiwen Xu, Qinhuangdao (CN); Minglei Li, Qinhuangdao (CN); Yao Dai, Qinhuangdao (CN); Shaoqian Wang, Qinhuangdao (CN); Weidong Liu, Qinhuangdao (CN); Xi Li, Qinhuangdao (CN)

(73) Assignee: CITIC DICASTAL CO., LTD., Hebei (CN)

( * ) Notice: Subject to any disclaimer, the term of this patent is extended or adjusted under 35 U.S.C. 154(b) by 157 days.

(21) Appl. No.: 17/186,195

(22) Filed: Feb. 26, 2021

(65) Prior Publication Data
US 2021/0331638 A1    Oct. 28, 2021

(30) Foreign Application Priority Data
Apr. 28, 2020   (CN) .......................... 202010348065.0

(51) Int. Cl.
*B60R 16/033* (2006.01)
*H02J 7/00* (2006.01)
*H04N 23/60* (2023.01)

(52) U.S. Cl.
CPC ........ *B60R 16/033* (2013.01); *H02J 7/00304* (2020.01); *H02J 7/00308* (2020.01); *H04N 23/60* (2023.01)

(58) Field of Classification Search
CPC ..... B60R 16/023; B60R 16/03; B60R 16/033; B60R 1/00; H04N 5/232; H02J 7/00304; H02J 7/00308; G08C 17/02
(Continued)

(56) References Cited

U.S. PATENT DOCUMENTS

| | | | |
|---|---|---|---|
| 2007/0185983 A1 | 8/2007 | Qi | |
| 2014/0232870 A1* | 8/2014 | Mondal | H04N 7/183 |
| | | | 348/148 |

(Continued)

FOREIGN PATENT DOCUMENTS

| | | |
|---|---|---|
| CN | 201012651 Y | 1/2008 |
| CN | 102371839 A | 3/2012 |

(Continued)

OTHER PUBLICATIONS

Supplementary European Search Report in the European application No. 21156440.6, dated Aug. 3, 2021, 6 pgs.

*Primary Examiner* — Thai Q Tran
*Assistant Examiner* — Nienru Yang
(74) *Attorney, Agent, or Firm* — Cooper Legal Group, LLC

(57) ABSTRACT

A hub rotation imaging control system, includes a power management unit, which can output required direct current for other units; a parameter monitoring unit, which can monitor surrounding environment data of the hub and vehicle driving data; a main control management unit, which can receive the environment data and vehicle driving data monitored by the parameter monitoring unit, and generate video data and control instructions according to the environment data and vehicle driving data; and a data processing unit, which can receive the video data and control instructions generated by the main control management unit, and output drive signals to drive hub imaging.

9 Claims, 5 Drawing Sheets

(58) Field of Classification Search
USPC .......................................................... 348/148
See application file for complete search history.

(56) References Cited

U.S. PATENT DOCUMENTS

2017/0086545 A1* 3/2017 Gharabegian .......... A45B 19/02
2019/0291507 A1* 9/2019 Li ......................... G09F 21/045

FOREIGN PATENT DOCUMENTS

| DE | 102017215180 A1 | 2/2019 |
| EP | 1783994 A1 | 5/2007 |
| JP | 2005227752 A | 8/2005 |
| JP | 2011013436 A | 1/2011 |
| JP | 2014042454 A | 3/2014 |

\* cited by examiner

HUB ROTATION IMAGING CONTROL SYSTEM

CROSS-REFERENCE TO RELATED APPLICATION

The present application claims benefit of Chinese Patent Application No. 202010348065.0, filed on Apr. 28, 2020, the contents of which are hereby incorporated by reference in their entirety.

BACKGROUND

As vehicles are increasingly popular, they carry various transportation purposes. With the development of science and technology, the pursuit of added value to vehicles is increasing. Vehicle display devices can bring cool visual effects to users, but the existing vehicle display devices, which usually use the product form of separately designed and independently installed micro hub lamps, have single display functions and cannot meet current increasing requirements for intelligent display.

SUMMARY

The present invention relates to the field of vehicles, and specifically to a hub rotation imaging control system.

In view of this, the present invention aims to provide a hub rotation imaging control system, which can be integrated into an imaging apparatus, and can provide the imaging apparatus with a more intelligent imaging display mode to meet more application requirements.

In order to achieve the above objective, the technical solution of the present invention is implemented as follows:

A hub rotation imaging control system, including a power management unit, configured to output required direct current for other units; a parameter monitoring unit, configured to monitor surrounding environment data of the hub and vehicle driving data; a main control management unit, configured to receive the environment data and vehicle driving data monitored by the parameter monitoring unit, and generate video data and control instructions according to the environment data and vehicle driving data; and a data processing unit, configured to receive the video data and control instructions generated by the main control management unit, and output drive signals to drive hub imaging.

In some embodiments, the data processing unit and the main control management unit are further configured to exchange the control instructions.

In some embodiments, the power management unit includes a rectifier assembly, an overvoltage and overcurrent protection assembly and a power conversion assembly electrically connected in sequence, and the power conversion assembly is configured to output the required direct current for the parameter monitoring unit, the main control management unit and the data processing unit.

In some embodiments, an output end of the rectifier assembly is electrically connected to a charging management assembly and a rechargeable battery pack in sequence, and an output end of the rechargeable battery pack is electrically connected to the overvoltage and overcurrent protection assembly.

In some embodiments, the rechargeable battery pack is electrically connected with a battery protection assembly.

In some embodiments, the parameter monitoring unit includes a rotation speed monitoring assembly, configured to monitor rotation speed information of the hub; a brightness monitoring assembly, configured to monitor brightness information of a surrounding environment; a voltage monitoring assembly, configured to monitor voltage information input by the power management unit; and a low-power microprocessor, configured to receive the rotation speed information monitored by the rotation speed monitoring assembly, the brightness information monitored by the brightness monitoring assembly, and the voltage information monitored by the voltage monitoring assembly.

In some embodiments, the main control management unit integrates an ARM processor, an RTC, a NOR Flash memory, an SD card and other structures.

In some embodiments, the main control management unit further integrates a wireless communication assembly.

In some embodiments, the wireless communication assembly includes at least one of a 4G communication assembly, a 5G communication assembly, a WiFi communication assembly, or a LoRa communication assembly.

In some embodiments, the data processing unit integrates a rotation speed sensor, an SRAM cache and an FPGA, the rotation speed sensor is configured to output the monitored rotation speed data to the FPGA, and the FPGA receives the video data and control instructions output by the main control management unit, and finally outputs the drive signals to drive hub imaging.

Compared with the prior art, the hub rotation imaging control system according to the present invention has the following advantages:

The hub rotation imaging control system can make up for the defect that the existing vehicle system displays single information outside the vehicle, can be integrated into an imaging apparatus, and can provide the imaging apparatus with a more intelligent imaging display mode to meet more application requirements.

BRIEF DESCRIPTION OF DRAWINGS

The accompanying drawings constituting a part of the present invention are used for providing a further understanding of the present invention, and the schematic embodiments of the present invention and the descriptions thereof are used for interpreting the present invention, rather than constituting improper limitations to the present invention. In the drawings.

DETAILED DESCRIPTION

It should be noted that the embodiments in the present invention and the features in the embodiments can be combined with each other without conflicts.

The technical solutions of the present invention will be described clearly and completely with reference to the accompanying drawing and in combination with the embodiments. Apparently, the described embodiments are part of, not all of, the embodiments of the present invention. Based on the embodiments of the present invention, all other embodiments obtained by those of ordinary skill in the art without any creative effort shall fall within the protection scope of the present invention.

The following describes a hub rotation imaging control system according to an embodiment of the present invention with reference to FIGS. 1 to 5 and in conjunction with the embodiments.

A hub rotation imaging control system includes a power management unit, a parameter monitoring unit, a main control management unit and a data processing unit.

Figure 1:
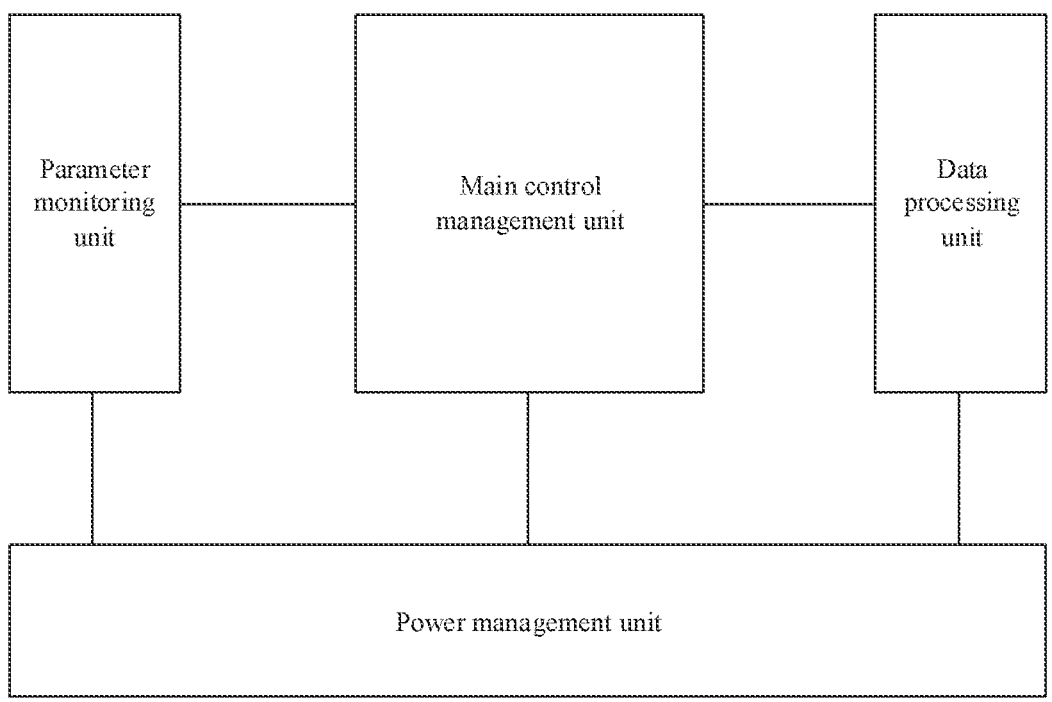
FIG. 1 is a schematic diagram of a hub rotation imaging control system according to the present invention.
Figure 2:
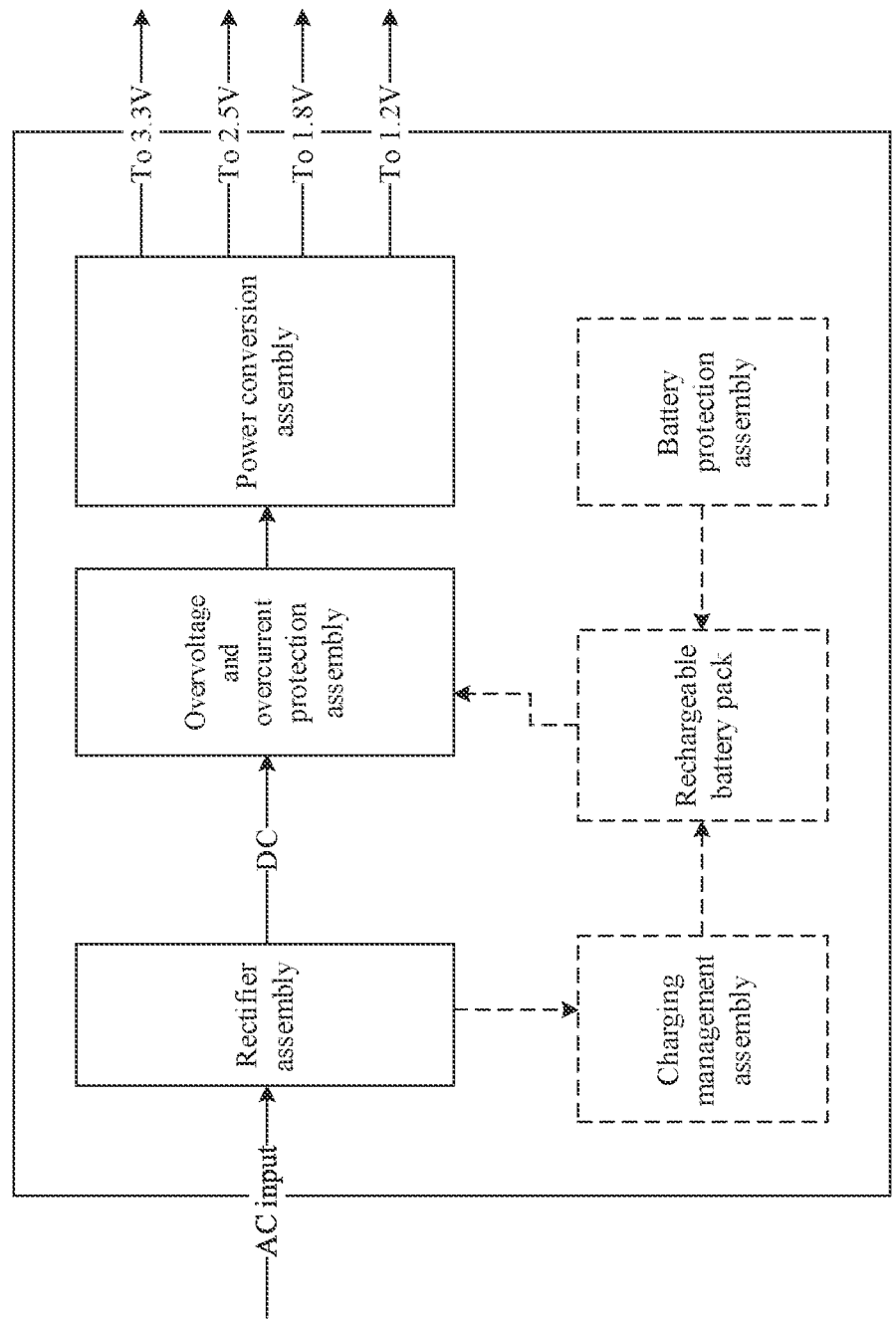
FIG. 2 is a schematic diagram of a power management unit of the hub rotation imaging control system according to the present invention.

As shown in FIG. 2, the power management unit includes a rectifier assembly, an overvoltage and overcurrent protection assembly and a power conversion assembly electrically connected in sequence. The power conversion assembly can output required direct current for the parameter monitoring unit, the main control management unit and the data processing unit. The input alternating current is converted into direct current by the rectifier assembly of the power management unit, the direct current is output to the power conversion assembly through the overvoltage and overcurrent protection assembly, and the direct current of 3.3 V, 2.5 V, 1.8 V, 1.2 V, and the like used by other units is finally output.

In some embodiments, the power management unit may be further provided with a rechargeable battery pack and related processing assemblies, such as a charging management assembly and a battery protection assembly. When the system integrates the rechargeable battery pack and a self-powered unit, referring to dotted parts in FIG. 2, the power management unit receives alternating current input provided by the self-powered unit, the rectifier assembly provides direct current input for the charging management assembly, the charging management assembly provides charging management for the rechargeable battery pack, the battery protection assembly provides the rechargeable battery pack with protection mechanisms including temperature protection, the direct current output by the rechargeable battery pack is input to the power conversion assembly through the overvoltage and overcurrent protection assembly, and the power conversion assembly performs DC-DC (DC-DC is an apparatus that converts electric energy of one voltage value into electric energy of another voltage value in a direct current circuit) conversion, and finally outputs direct current of 3.3 V, 2.5 V, 1.8 V, 1.2 V, and the like used by other units.

Figure 3:
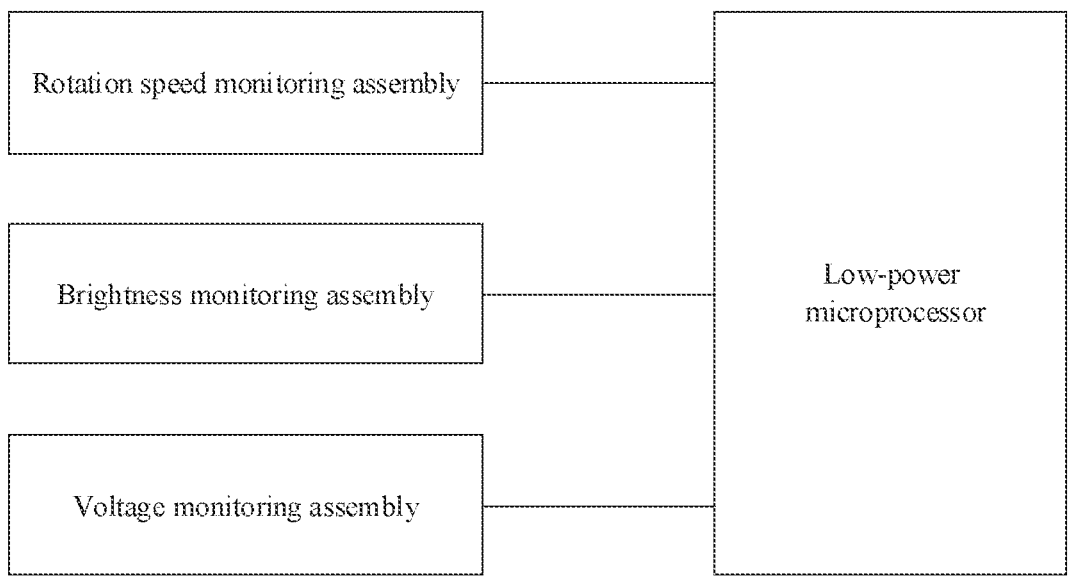
FIG. 3 is a schematic diagram of a parameter monitoring unit of the hub rotation imaging control system according to the present invention.

As shown in FIG. 3, the parameter monitoring unit includes a rotation speed monitoring assembly, which can monitor rotation speed information of the hub; a brightness monitoring assembly, which can monitor brightness information of a surrounding environment; a voltage monitoring assembly, which can monitor voltage information input by the power management unit; and a low-power microprocessor, which can receive the rotation speed information monitored by the rotation speed monitoring assembly, the brightness information monitored by the brightness monitoring assembly and the voltage information monitored by the voltage monitoring assembly, and output the state monitoring data to the main control management assembly to provide a data basis for the adaptive display of the imaging system.

Figure 4:
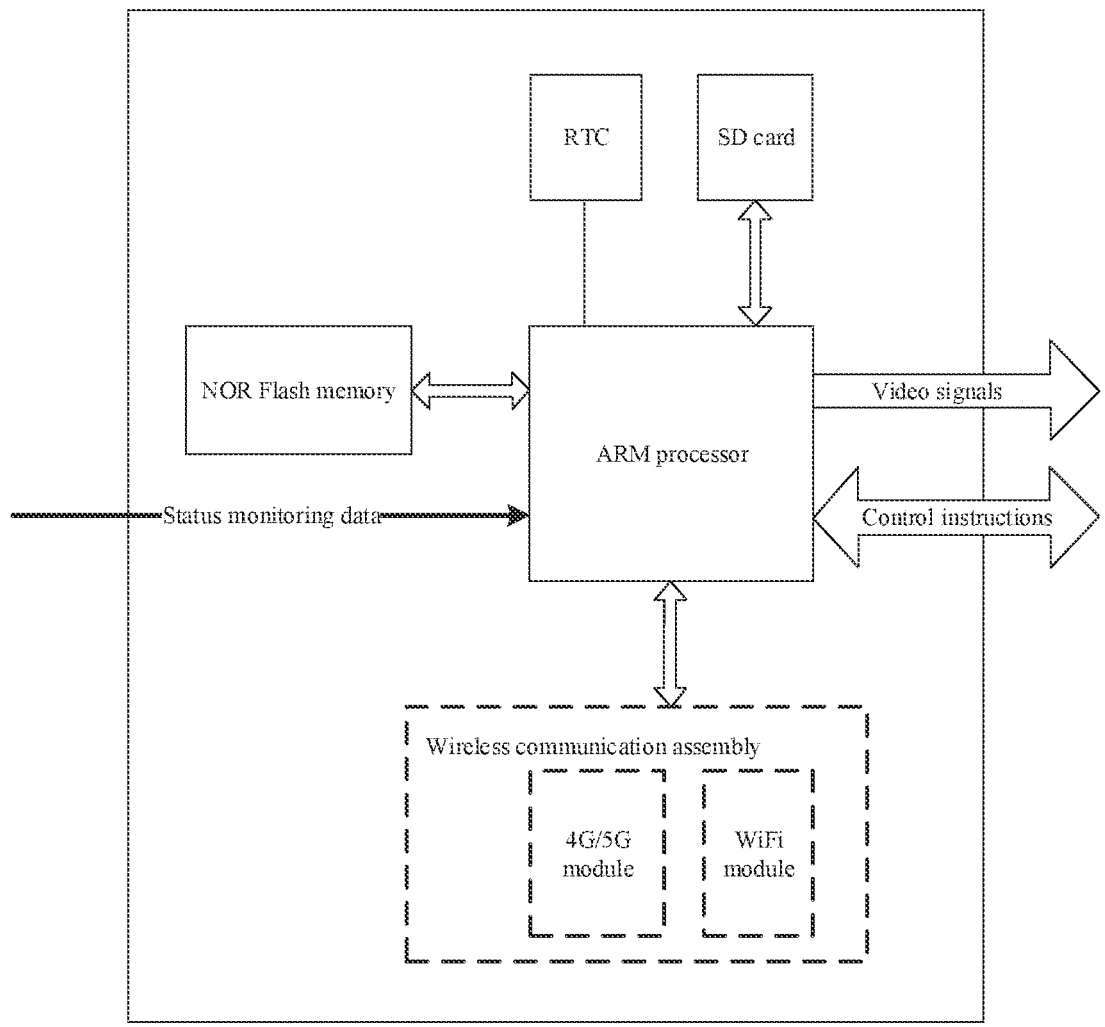
FIG. 4 is a schematic diagram of a main control management unit of the hub rotation imaging control system according to the present invention.

As shown in FIG. 4, the main control management unit integrates an ARM processor (Advanced RISC Machines, a 32-bit reduced instruction set processor architecture), an RTC (Real_Time Clock, RTC is an integrated circuit, usually referred to as a clock chip), a NOR Flash memory, an SD card and other structures. The ARM processor receives the state monitoring data output by the parameter monitoring unit, the RTC provides a real-time clock for the ARM processor, the NOR Flash memory provides read and write cutoff of programs and data for the ARM processor, and the SD card can store display content data.

In some embodiments, the main control management unit can further integrate a wireless communication assembly, as shown by the dotted line in FIG. 4, and the ARM processor can also acquire the display content data and display demand data through the wireless communication assembly, wherein the wireless communication assembly can integrate, but is not limited to a 4G communication assembly, a 5G communication assembly, a WiFi communication assembly or a LoRa communication assembly (Long Range Radio, a low-power local area network wireless standard), and any combination thereof. The ARM processor finally outputs video data and control instructions to the data processing unit.

Figure 5:
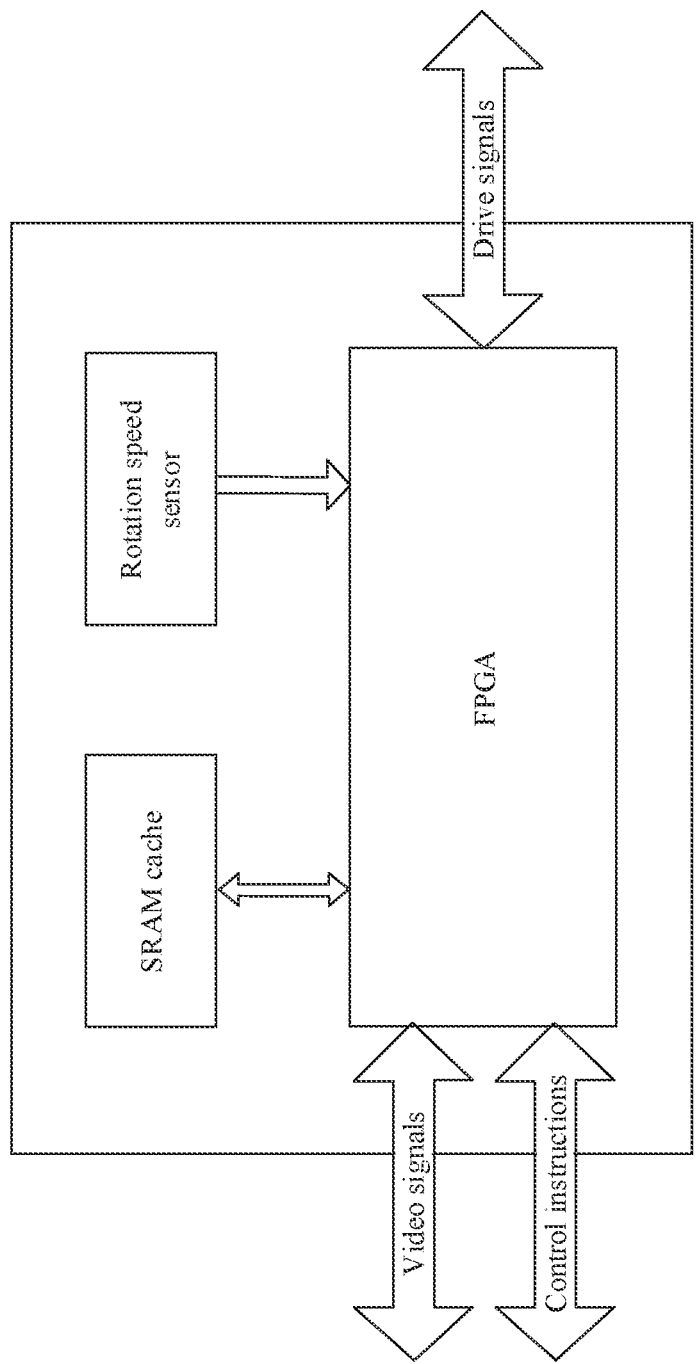
FIG. 5 is a schematic diagram of a data processing unit of the hub rotation imaging control system according to the present invention.

As shown in FIG. 5, the data processing unit integrates a rotation speed sensor, an SRAM (Static Random-Access Memory) cache and an FPGA (Field Programmable Gate Array). The rotation speed sensor can output the monitored rotation speed data to the FPGA, and the FPGA receives the video data and control instructions output by the main control management unit, combines the rotation speed data to drive the video content that needs to be displayed according to the requirements of the control instructions, and finally outputs drive signals to drive hub imaging.

In some embodiments, the data processing unit and the main control management unit can exchange the control instructions.

Compared with the prior art, the hub rotation imaging control system according to the present invention has the following advantages:

The hub rotation imaging control system can make up for the defect that the existing vehicle system displays single information outside the vehicle, can be integrated into an imaging apparatus, and can provide the imaging apparatus with a more intelligent imaging display mode to meet more application requirements.

In the description of the present invention, it should be understood that the terms "center", "longitudinal", "transverse", "front", "rear", "left", "right", "vertical", "horizontal", "top", "bottom", "inner", "outer", and the like indicate orientations or positional relationships based on the drawings. The terms are only for description convenience of the present invention and simplification of the description, but do not indicate or imply that the pointed apparatuses or elements must have specific orientations or be constructed and operated in specific orientations. Therefore, the terms should not be understood to limit the present invention.

Furthermore, the terms "first" and "second" are only for the sake of description, and cannot be understood as indicating or implying the relative importance or implicitly indicating the quantity of the indicated technical features. Thus, the features defined with "first" and "second" may explicitly or implicitly include one or more of these features. In the description of the present invention, "a plurality of" means at least two, e.g., two, three, etc., unless otherwise specified.

In the present invention, unless otherwise specified and defined, the terms "mounted", "joined", "connected", "fixed" and the like should be understood in a broad sense, for example, being fixedly connected, detachably connected, integrated; mechanically connected, electrically connected, mutually communicated; directly connected, indirectly connected by a medium, communication of interiors of two components or interaction of two components. A person of ordinary skill in the art could understand the specific meanings of the above terms in the present invention according to specific circumstances.

The foregoing descriptions are merely preferred embodiments of the present invention, but are not intended to limit the present invention. Any modification, equivalent substitution, improvement and the like made within the spirit and principle of the present invention shall fall within the protection scope of the present invention.

The invention claimed is:

1. A hub rotation imaging control system, comprising:
a power management unit, configured to output required direct current for other units;
a parameter monitoring unit, configured to monitor surrounding environment data of a hub and vehicle driving data;
a main control management unit, configured to receive the environment data and the vehicle driving data monitored by the parameter monitoring unit, and generate video data and control instructions according to the environment data and the vehicle driving data; and
a data processing unit, configured to receive the video data and the control instructions generated by the main control management unit, and output drive signals to drive hub imaging,
wherein the parameter monitoring unit comprises:
a rotation speed monitoring assembly, configured to monitor rotation speed information of the hub;
a brightness monitoring assembly, configured to monitor brightness information of a surrounding environment;
a voltage monitoring assembly, configured to monitor voltage information input by the power management unit; and
a low-power microprocessor, configured to receive the rotation speed information monitored by the rotation speed monitoring assembly, the brightness information monitored by the brightness monitoring assembly, and the voltage information monitored by the voltage monitoring assembly,
wherein the low-power microprocessor is configured to output, state monitoring data comprising the rotation speed information, the brightness information and the voltage information, to the main control management unit to generate the video data and the control instructions.

2. The hub rotation imaging control system according to claim 1, wherein the data processing unit and the main control management unit are further configured to exchange the control instructions.

3. The hub rotation imaging control system according to claim 2, wherein the power management unit comprises a rectifier assembly, an overvoltage and overcurrent protection assembly and a power conversion assembly electrically connected in sequence, and the power conversion assembly is configured to output the required direct current for the parameter monitoring unit, the main control management unit and the data processing unit.

4. The hub rotation imaging control system according to claim 3, wherein an output end of the rectifier assembly is electrically connected to a charging management assembly and a rechargeable battery pack in sequence, and an output end of the rechargeable battery pack is electrically connected to the overvoltage and overcurrent protection assembly.

5. The hub rotation imaging control system according to claim 4, wherein the rechargeable battery pack is electrically connected with a battery protection assembly.

6. The hub rotation imaging control system according to claim 2, wherein the main control management unit integrates an advanced RISC machine (ARM) processor, a real-time clock (RTC), a NOR Flash memory, and a secure digital (SD) card.

7. The hub rotation imaging control system according to claim 6, wherein the main control management unit further integrates a wireless communication assembly.

8. The hub rotation imaging control system according to claim 7, wherein the wireless communication assembly comprises at least one of a 4G communication assembly, a 5G communication assembly, a WiFi communication assembly, or a LoRa communication assembly.

9. The hub rotation imaging control system according to claim 2, wherein the data processing unit integrates a rotation speed sensor, a static random access memory (SRAM) cache and a field-programmable gate array (FPGA), the rotation speed sensor is configured to output monitored rotation speed data to the FPGA, and the FPGA receives the video data and the control instructions output by the main control management unit, and finally outputs the drive signals to drive hub imaging.

* * * * *